(12) United States Patent
Hansson

(10) Patent No.: US 9,364,969 B2
(45) Date of Patent: Jun. 14, 2016

(54) MIXING APPARATUS FOR PUMPABLE MIXTURES AND METHOD RELATED THERETO

(75) Inventor: Martin Hansson, Vänersborg (SE)

(73) Assignee: SIKA TECHNOLOGY AG, Baar (CH)

( * ) Notice: Subject to any disclaimer, the term of this patent is extended or adjusted under 35 U.S.C. 154(b) by 434 days.

(21) Appl. No.: 13/816,103

(22) PCT Filed: Sep. 30, 2011

(86) PCT No.: PCT/EP2011/067095
§ 371 (c)(1),
(2), (4) Date: Mar. 18, 2013

(87) PCT Pub. No.: WO2012/042012
PCT Pub. Date: Apr. 5, 2012

(65) Prior Publication Data
US 2013/0170314 A1 Jul. 4, 2013

(30) Foreign Application Priority Data

Oct. 1, 2010 (EP) ..................................... 10185962
Oct. 7, 2010 (CH) ..................................... 1650/10

(51) Int. Cl.
*B28C 7/04* (2006.01)
*B01F 5/00* (2006.01)
(Continued)

(52) U.S. Cl.
CPC .............. *B28C 7/0404* (2013.01); *B01F 5/0057* (2013.01); *B01F 5/048* (2013.01);
(Continued)

(58) Field of Classification Search
CPC ...... B01F 5/0466; B01F 5/048; B01F 5/0057; B01F 5/0068; B01F 5/0065; B01F 5/0062; B01F 5/06; B28C 7/0404

USPC ................................. 366/165.1, 165.2, 175.2
See application file for complete search history.

(56) References Cited

U.S. PATENT DOCUMENTS 671,075 A * 4/1901 White ........................... 366/137
835,619 A * 11/1906 Isaacs et. al. ............... 366/165.4
(Continued)

FOREIGN PATENT DOCUMENTS

| CA | 2551288 A1 | 7/2005 |
|----|------------|--------|
| CH | 690 758 A5 | 1/2001 |

(Continued)

OTHER PUBLICATIONS

Apr. 2, 2013 International Preliminary Report on Patentability issued in International Application No. PCT/EP2011/067095.
(Continued)

*Primary Examiner* — Tony G Soohoo
(74) *Attorney, Agent, or Firm* — Oliff PLC

(57) ABSTRACT

The invention relates to a mixing apparatus for the metered addition of an additive to a pumpable mixture, in particular a pumpable hydraulically setting mixture, in particular a liquid shotcrete composition, wherein the mixing apparatus includes a delivery line for delivering the mixture through the mixing apparatus, and a metering device communicating with the deliver line for introducing the additive into the mixture is provided, wherein the mixing apparatus is including in that the metering device has a device for dispersing the additive in a carrier method such that the additive can be introduced into the mixture in a state in which the additive is finely distributed in the carrier medium.

23 Claims, 4 Drawing Sheets

(51) Int. Cl.
  *B01F 5/04*   (2006.01)
  *B01F 15/02*  (2006.01)
  *B28C 5/06*   (2006.01)
  *C04B 28/02*  (2006.01)
  *C04B 40/00*  (2006.01)
  *B01F 3/12*       (2006.01)
  *C04B 111/00*     (2006.01)

(52) U.S. Cl.
  CPC ............. *B01F 5/0466* (2013.01); *B28C 5/06* (2013.01); *B28C 7/0413* (2013.01); *C04B 28/02* (2013.01); *C04B 40/0028* (2013.01); *B01F 3/12* (2013.01); *B01F 2215/0431* (2013.01); *C04B 2111/00172* (2013.01)

(56) References Cited

U.S. PATENT DOCUMENTS

| | | | | |
|---|---|---|---|---|
| 932,265 | A * | 8/1909 | Fritz | 366/166.1 |
| 1,469,479 | A * | 10/1923 | Kent | 239/405 |
| 1,496,345 | A * | 6/1924 | Lichtenthaeler | 366/165.2 |
| 1,513,624 | A * | 10/1924 | Parker | 239/404 |
| 1,874,209 | A * | 8/1932 | Schnabel | 261/83 |
| 2,784,948 | A * | 3/1957 | Pahl et al. | 366/174.1 |
| 2,816,518 | A * | 12/1957 | Daggett | 222/145.6 |
| 2,831,754 | A * | 4/1958 | Manka | 423/658.5 |
| 2,886,297 | A * | 5/1959 | Ralph | 366/76.91 |
| 3,108,892 | A * | 10/1963 | Krinov | 106/466 |
| 3,238,021 | A * | 3/1966 | Webber et al. | 422/224 |
| 3,542,342 | A * | 11/1970 | Barron | 366/178.1 |
| 3,563,517 | A * | 2/1971 | Harriman | 366/6 |
| 3,741,533 | A * | 6/1973 | Winn, Jr. | 366/136 |
| 3,794,299 | A * | 2/1974 | Wagner et al. | 210/198.1 |
| 4,007,921 | A * | 2/1977 | Zingg | 366/10 |
| 4,053,142 | A * | 10/1977 | Johannes | 366/165.1 |
| 4,108,732 | A * | 8/1978 | Nuttall, Jr. | 201/22 |
| 4,390,284 | A * | 6/1983 | Hyde et al. | 366/165.5 |
| 4,474,477 | A * | 10/1984 | Smith et al. | 366/165.5 |
| 4,652,363 | A * | 3/1987 | Miller | 209/734 |
| 4,838,701 | A * | 6/1989 | Smith et al. | 366/136 |
| 5,779,355 | A * | 7/1998 | Pullman | 366/137 |
| 7,575,364 | B2 * | 8/2009 | Goto et al. | 366/165.2 |
| 2008/0267006 | A1 * | 10/2008 | Moreira Campos | 366/165.1 |
| 2009/0201760 | A1 * | 8/2009 | Vorage et al. | 366/163.1 |
| 2011/0299356 | A1 * | 12/2011 | Allen | 366/6 |
| 2012/0012534 | A1 * | 1/2012 | Turner | 210/738 |
| 2013/0170314 | A1 * | 7/2013 | Hansson | 366/3 |

FOREIGN PATENT DOCUMENTS

| | | |
|---|---|---|
| DE | 31 14 027 A1 | 2/1982 |
| DE | 31 14027 A1 | 2/1982 |
| DE | 196 26 312 A1 | 1/1998 |
| EP | 0 738 676 A1 | 10/1996 |
| EP | 1 254 700 A1 | 11/2002 |
| EP | 1 570 908 A1 | 9/2005 |
| EP | 1 600 205 A1 | 11/2005 |
| EP | 1 767 322 A1 | 3/2007 |
| WO | WO 2005/065906 A1 | 7/2005 |

OTHER PUBLICATIONS

Dec. 21, 2011 International Search Report issued in International Application No. PCT/EP2011/067095 (with translation).

Nov. 17, 2014 Office Action Issued in Chinese Application No. 201180046398.7.

Dec. 11, 2015 Office Action issued in Chilean Application No. 00517-2013. 14 pages. Dec. 11, 2015.

Feb. 4, 2016 Office Action issued in Chinese Application No. 201180046398.7, with english translation.

* cited by examiner

MIXING APPARATUS FOR PUMPABLE MIXTURES AND METHOD RELATED THERETO

TECHNICAL FIELD

The invention relates to a mixing apparatus for the metered addition of an additive into a pumpable mixture, in particular a pumpable hydraulically setting mixture, in particular a liquid shotcrete composition, wherein the mixing apparatus comprises a delivery line for delivering the mixture through the mixing apparatus, and a metering device communicating with the delivery line for introducing the additive into the mixture is arranged. The invention relates furthermore to the use of such mixing apparatus as well as a method for the metered addition of an additive into a pumpable mixture.

PRIOR ART

The metered addition or the admixing of small quantities of a substance, such as an additive to a pumpable mixture, occurs in many applications. A proper intermixture, in particular with heterogeneous mixtures containing solids, is frequently not easy to obtain, however. It is possible that the normally used static mixtures can be plugged by the solids content and can be quickly damaged or even destroyed by abrasion.

The metered addition of additives in hydraulically setting mixtures, which normally comprise a relatively high percentage of solids consisting of sand, gravel and cement, can be particularly problematic. The admixing of additives during the processing of shotcrete is particularly demanding. Prior to spraying, the shotcrete flows at high velocity through a delivery line with an attached spray nozzle. Necessary constituents of the formulation, such as water (with dry-mix shotcrete), compressed air and additives (e.g. setting accelerators) are normally metered only directly ahead of the spray nozzle. The now ready prepared shotcrete mixture subsequently shoots under high pressure onto the application site, compacting heavily at the same time so that a final compacted concrete texture is created immediately. Accordingly, particularly efficient and robust mixing devices are required for shotcrete processing.

To this effect, EP 1 570 908 A1 (Sika Technology AG) discloses a shotcrete nozzle for the application of wet-mix shotcrete or dry-mix shotcrete, for example. This nozzle has a multitude of lateral channels for introducing additives into the shotcrete.

DE 31 14 027 A1 (Aliva AG) furthermore describes a device for the application of shotcrete with a spray nozzle in the wet-mix method. In this context, the spray nozzle has a lateral connection with a metering unit used for admixing special setting accelerators into the shotcrete. A part of the setting accelerator can optionally be added together with compressed air to the shotcrete in a release chamber upstream.

As has been shown, known mixing devices from the prior art normally require a relatively high additive quantity, in order to obtain a sufficiently uniform distribution and efficacy in the shotcrete. This impairs the economics and unnecessarily pollutes the environment. For this reason, there is still a need for an improved method and a more effective mixing device for the metered addition of an additive into a pumpable mixture, in particular in shotcrete compositions.

REPRESENTATION OF THE INVENTION

For this reason, the object of the present invention therefore is to provide a mixing apparatus associated with the technical field mentioned at the outset, which facilitates a more effective mixing of an additive to be metered into a pumpable mixture, in particular into a pumpable hydraulically setting mixture, in particular into a liquid shotcrete composition. A further object of the invention is to provide an appropriate method.

The invention teaches that the object with respect to the mixing apparatus is solved by the features of Claim 1. The metering device therefore has a device for dispersing the additive in a carrier medium, such that the additive can be introduced into the mixture in a state in which the additive is finely distributed in the carrier medium.

The object with respect to the method is accordingly solved by the features of the independent Claim 15, according to which the additive during the metered addition of an additive into a pumpable mixture is dispersed in a carrier medium and subsequently introduced into the pumpable mixture.

Further aspects of the invention are the subject of further independent claims. Particularly preferred embodiments of the invention are the subject of the dependent claims.

In the following context, a pumpable mixture is understood to be in particular a flowable and/or a pourable mixture, made up of at least two different components. In principle, the mixture can comprise gaseous, liquid and/or solid components. The mixture contains particularly a conglomerate made up of several different solids which are optionally mixed with a liquid. Particularly preferred is that the mixture is a hydraulically setting mixture, such as a dry concrete composition comprising aggregates and cement, or a wet-concrete composition containing aggregates, cement and water. The mixture particularly exists as a liquid shotcrete composition.

The carrier medium is in particular a liquid and/or a gas. The carrier medium can be an aqueous liquid, for example, such as water. Particularly preferably the carrier medium is a gas, in particular compressed air or pressurized air. The carrier medium is particularly selected so that the additive is not soluble in the carrier medium.

The term "the additive finely distributed in the carrier medium" means in particular that the additive is present as a disperse phase in the carrier medium as dispersion medium. A person skilled in the art is in principle familiar with corresponding devices and methods for dispersing the additive in the carrier medium. Depending on the application, mixers, for example, which are especially designed for dispersion processes, or atomizers, are suitable. In this context, the device for dispersing the additive in the carrier medium or an atomizer is designed in particular such that an additive present in liquid form can be comminuted into fine droplets.

In this document, "delivery line" is in principle understood to be a device for the conveyance of gases, liquids and/or solids. For this purpose, the delivery line is designed in particular for the conveyance of hydraulically setting mixtures, preferably shotcrete compositions. An internal diameter of the delivery line is preferably at least 10 mm. The inside diameter of the delivery line is preferably within the range of 20-300 mm, in particular 30-100 mm. Advantageously, the delivery line comprises a tube section with a circular cylindrical cross-section.

Compared to known devices pursuant to the prior art it was found surprisingly that using the mixing apparatus according to the invention or the method according to the invention it is possible to obtain a more homogenous distribution of the additive in the pumpable mixture. This might be attributable to the fact that the finely distributed additives in the carrier medium can be distributed more effectively and more uniformly in the pumpable mixture.

It was moreover especially found, that by using the mixing apparatus in particular during the metered addition of additives to concrete compositions, the additive quantity can be significantly reduced while maintaining the same efficacy. During the metered addition of setting accelerators to shotcrete mixtures using compressed air or pressurized air as carrier medium, it was possible to reduce the added quantity of the setting accelerator by up to 20-30%, for example, whilst maintaining at least the same efficacy. It is consequently possible to save a significant quantity of additives, which clearly increases the cost-effectiveness and is also advantageous from a perspective of environmental toxicology.

As a result, the mixing apparatus according to the invention or the method according to the invention therefore facilitate a more effective mixing of an additive in a pumpable mixture.

The metering device preferably comprises a mixing chamber communicating with the delivery line, where said mixing chamber has a first inlet for feeding the additive and a second inlet for feeding the carrier medium. In this way, the additive and the carrier medium can be fed separately into the mixing chamber of the metering device. The separate inlets particularly facilitate optimal process control, since both components can be added controlled into the mixing chamber provided for generating the dispersion.

In principle it is also conceivable, however, to feed the carrier medium and the additive together by means of a single inlet into the metering device. Under certain circumstances, this may however limit the options during the generation of the dispersion.

The mixing chamber preferably comprises a first section surrounding the delivery line, in particular with an annular cavity. As a result, the additive which is finely distributed in the carrier medium can be introduced into the pumpable mixture all around and/or from all sides by means of correspondingly arranged ports which lead into the delivery line, for example. In addition, this improves the mixing action.

The mixing chamber furthermore particularly includes a tubular second section which leads into the first section, wherein particularly the second section is shaped curved, at least partially. For this purpose, the tubular second section of the mixing chamber forms the feed-line to the first section and moreover offers sufficient space for the device for dispersing the additives in the carrier medium. The combination of a first section surrounding the feed-line and a tubular second section in particular facilitates a compact design and at the same time optimal mixing action.

In principle, however, other embodiments of the dosing device are also possible.

Particularly preferably, the tubular second section of the mixing chamber substantially in a tangential direction and/or eccentrically terminates in the first section, which in particular includes a tubular cavity. In this way, the dispersed additive in the carrier medium in terms of fluid dynamics can be fed particularly advantageously into the tubular cavity and be distributed around the feed-line, which has an overall beneficial effect in terms of the mixing action.

The device for dispersing the additive is furthermore preferably arranged on the first inlet for feeding the additive and projects at least partially into the first section of the mixing chamber. For this purpose, the first inlet for feeding the additive is arranged advantageously in the direction of feed upstream of the second inlet for feeding the carrier medium. As a result of such arrangement, it is possible to obtain a particularly effective mixing of the additive in the carrier medium, since the carrier medium is automatically moved past the inlet for the additive and mixes with the same.

Accordingly, the additive is directly dispersed into the carrier medium moving past, which in turn improves the mixing. Such configuration moreover results in an especially space-saving design.

In principle, however, also other configurations of the inlets are possible, as long as this is expedient. But in some cases, it is possible that the mixing of carrier medium and additive becomes more difficult.

The first and the second inlet are in particular arranged to one another such that the additive and the carrier medium both collide from different directions in the mixing chamber. This can be achieved, for instance, in that a longitudinal centerline of the first inlet is inclined towards a longitudinal centerline of the second inlet. In this way, the additive can be distributed in the carrier medium even more effectively. In this context, an angle between the two different directions and/or between the longitudinal centerline of the first and the second inlet is advantageously 45-135°, particularly 85-95°.

It is particularly advantageous, if the first inlet for feeding the additive is positioned in a curvature of the second section of the mixing chamber. An angle of curvature of the second section advantageously is 60-120°, particularly 85-95°. With this type of arrangement, the additive can be introduced in a simple manner into the carrier medium with a velocity component in one direction of motion of the carrier medium and a velocity component perpendicular to the carrier medium, for example. This was generally found to be particularly advantageous regarding the dispersion of the additive as uniformly as possible in the carrier medium.

But in principle, the first inlet can also be present in a straight area of the mixing chamber.

An atomizing nozzle is advantageously provided as device for dispersing the additive. The atomizing nozzle is particularly designed such that an additive which exists in liquid form can be comminuted into fine droplets. Using a gas as the carrier medium, it is therefore effectively possible to form an aerosol and/or a fog. A person skilled in the art is aware of a multitude of possible designs for atomizing nozzles, such as single-fluid, two-fluid, pneumatic or ultrasonic atomizing nozzles.

As was shown, in the context of the invention, there are significant differences between the various types of atomizing nozzles. In this context it was surprisingly found that in particular atomizing nozzles in the form of spiral nozzles achieve particularly effective atomization. This particularly applies if the mixing unit according to the invention is used for the metered addition of liquid additives using compressed air as the carrier medium into shotcrete compositions.

A spiral nozzle has in particular a nozzle opening in the form of a spiral running in the direction of conveyance with at least one spire.

A suitable spiral nozzle in particular has available a spray angle of 45-175°, preferably 50-125°, further preferably 50-95°, especially preferably 55-65°. The spiral nozzle advantageously has available a full-conical spray jet. In other words, the spiral nozzle is advantageously designed such that it generates a substantially uniform, conical spray jet. The number of spires of the spiral jet is advantageously 1-6, especially 2-4. In this context, a diameter of a central nozzle bore or a free opening of the spiral nozzle advantageously is 1-6 mm, preferably 2-4 mm. A maximum diameter of the spiral nozzle, particularly in a direction transverse to the longitudinal direction of the spiral nozzle, is preferably in the range of 5-30 mm, particularly preferably 15-20 mm. Furthermore, a ratio of a maximum length to maximum diameter of the spiral nozzle in a direction transverse to the longitudinal direction is 1.5:1-4:1, preferably 2.5:1-3:1. Such designed spiral nozzles were found to be particularly suitable for dispersing liquid additives in a gaseous carrier medium. This particularly during the metered addition of liquid additives with compressed air as carrier medium to shotcrete compositions.

But in principle, also differently designed atomizing nozzles can be used. It may be flat-spray nozzles, fog nozzles and/or two-phase nozzles.

It has been shown that a ratio of the inside diameter of the tubular second section of the mixing chamber to a maximum diameter of the atomizing nozzle, in particular of a spiral nozzle, is advantageously in the range of 1.25:1-10:1, preferably 1.5:1-5.1, even more preferably 1.75:1-2.25:1. In this way, an optimal mixing effect between the additive entering via the atomizing nozzle and the carrier medium results.

Further preferably, the metering device has available at least one inlet port which leads directly into the delivery line for introducing the additive into the pumpable mixture, which is designed such that a longitudinal axis of the inlet port does not intersect with a longitudinal axis or a longitudinal axis of symmetry of the delivery line. In other words, a straight running along the longitudinal centerline of the at least one inlet port penetrates the delivery line at points that are not diametrically opposite. With a circular cylindrical delivery line, the at least one inlet port therefore runs secant-like.

In particular, a straight running along the longitudinal centerline of the at least one inlet port therefore intersects any optional plane containing the longitudinal axis of the delivery line in an area outside or alongside the longitudinal axis of the delivery line. In known arrangements, in which the straights running along the longitudinal centerline of the inlet ports intersect the longitudinal axis of the delivery line, for example, this condition is not met. In this context, the inlet port particularly connects the delivery line with the first section of the mixing chamber surrounding the delivery line. Because of such inlet port, the additive entering or flowing into the pumpable mixture through the port has a tangential velocity component with reference to the delivery line, which additionally rotates the moving mixture which is moving through the delivery line in the longitudinal direction. For this purpose, this rotation around the longitudinal axis of symmetry of the delivery line results in a significant improvement of the mixing action of the mixing unit.

A metering device with such designed inlet port also improves the mixing action of the mixing unit, even irrespective of a device for dispersing the additive in the carrier medium. An alternative solution of the object of the invention therefore consists in a mixing device according to Claim 1, wherein instead of the device for dispersing the additive in a carrier medium at least one inlet port exists which terminates directly into the delivery line for introducing the additive into the pumpable mixture and wherein the at least one inlet port is designed such that a longitudinal axis of the inlet port does not intersect a longitudinal axis or a longitudinal axis of symmetry of the delivery line.

The longitudinal axis of the at least one inlet port is preferably tilted in an intended conveying direction of the mixture. An angle of incidence between the longitudinal axis of the inlet port and the longitudinal centerline of the delivery line or the intended conveying direction is in particular 10-80°, preferably 30-60°, for this purpose. As a result, the additive entering or flowing through the inlet port into the pumpable mixture has parallel velocity component with reference to the longitudinal axis of symmetry of the delivery line. As was shown, this results in an overall improvement in the action of the mixing unit. In principle, such angle of inclination can also be dispensed with, however.

In a particularly preferred embodiment, several inlet ports exist, which are arranged in a regular array and in particular axisymmetrically around the delivery line. Such arrays facilitate a particularly vigorous rotation of the mixture in the delivery line, which significantly increases the mixing action of the mixing unit again.

The mixing unit according to the invention is particularly advantageous as component of a device for the application of shotcrete. In addition to the mixing unit according to the invention such devices additionally include in particular a pump device for shotcrete as well as a shotcrete nozzle. In this context, the mixing apparatus is advantageously arranged between the pumping device and the shotcrete nozzle.

Principally it can also be advantageous to provide a mixing unit according to the invention with an adjacent one-piece design shotcrete nozzle in the direction of conveyance. This simplifies handling and in a simple manner facilitates a seamless transition between the mixing unit and the shotcrete nozzle, which possibly improves the flow behavior.

In a further aspect, the invention relates to a method for the metered addition of an additive into a pumpable mixture, in particular a hydraulically setting mixture, preferably a shotcrete composition. For this purpose, the additive is dispersed in a carrier medium and subsequently introduced into the mixture. The previously described mixing apparatus or the device for the application of shotcrete is used particularly for the method.

The carrier medium is preferably a gas, particularly air. Compressed air and/or pressurized air are particularly preferred. The additive is particularly a liquid, such as a setting accelerator.

The additive is dispersed in the carrier medium in particular by means of an atomizing nozzle. Preferably, a spiral nozzle is used as atomizing nozzle. In this context, the spiral nozzle is particularly designed as described in the foregoing.

During the dispersion of the additive in the carrier medium, an aerosol is advantageously formed, which is subsequently introduced into the mixture. In this context, the aerosol is particularly formed by the atomization of the additive in the carrier medium. In this context, the term “aerosol” is to be understood particularly as a dispersion consisting of a liquid additive, which exists as a disperse phase in the gaseous carrier medium as dispersion medium.

During the dispersion of the additive in the carrier medium, particularly the additive is pressurized with a higher pressure than the carrier medium. The additive is particularly preferably pressurized with a pressure that corresponds to at least 1.1 times, in particular to at least 1.5 times, preferably to at least 2 times of the pressure in the carrier medium. The additive is preferably pressurized with a pressure that corresponds to 1.1-10 times, in particular 2-5 times or 2-3 times of the pressure in the carrier medium.

The additive is especially pressurized with a pressure of 1-20 bar, in particular 10-20 bar, especially 15-20 bar. The carrier medium is especially pressurized with a pressure of 1-15 bar, in particular 5-15 bar, especially 5-10 bar.

By means of the above-mentioned pressure conditions and pressure ranges, it is possible to achieve a particularly advantageous and fine distribution of the additive in the carrier medium, as a result of which the additive can be distributed more effectively and more uniformly in the pumpable mixture.

In principle, however, it is also possible to operate outside of the above-mentioned values. This may even be expedient for special applications or instrumental constellations. Further advantageous embodiments and combinations of features of the invention result from the subsequent detailed description and the entirety of the Claims.

BRIEF DESCRIPTION OF THE DRAWINGS

The drawings used for explaining the embodiment, show as follows.

In principle, same parts in the figures are provided with the same reference symbols.

MEANS OF IMPLEMENTING THE INVENTION

1. Mixing Apparatus

Figure 1:
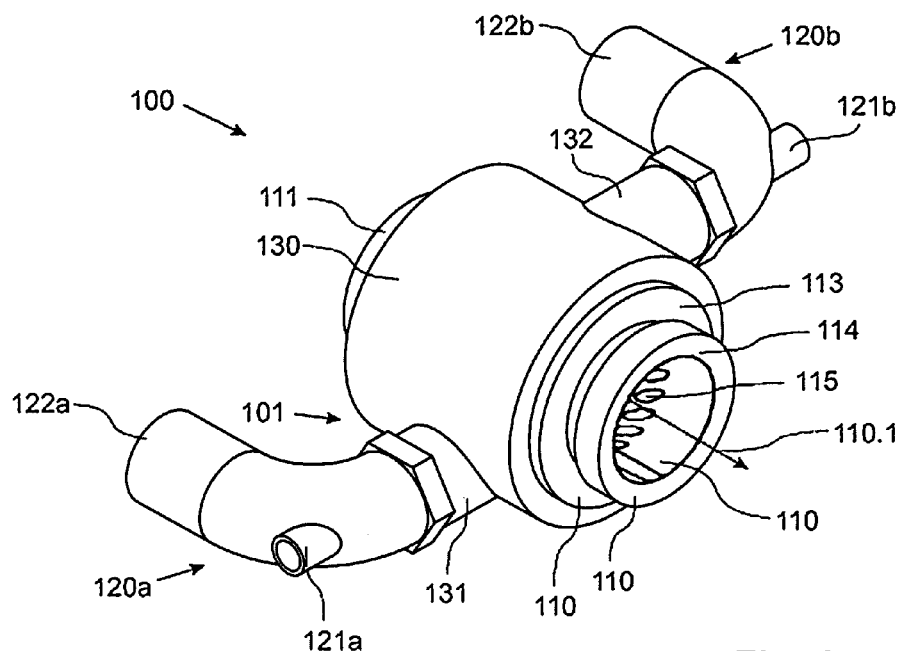
FIG. 1 Is a perspective view of a mixing apparatus according to the invention.
Figure 2:
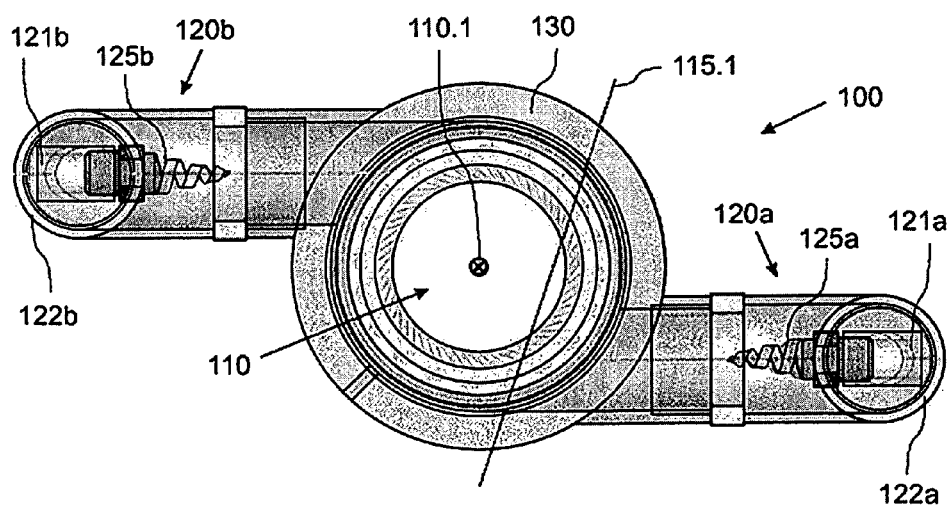
FIG. 2 Is a horizontal projection of the feed-side end of the mixing apparatus from FIG. 1 along the direction of conveyance in a semitransparent presentation.
Figure 3:
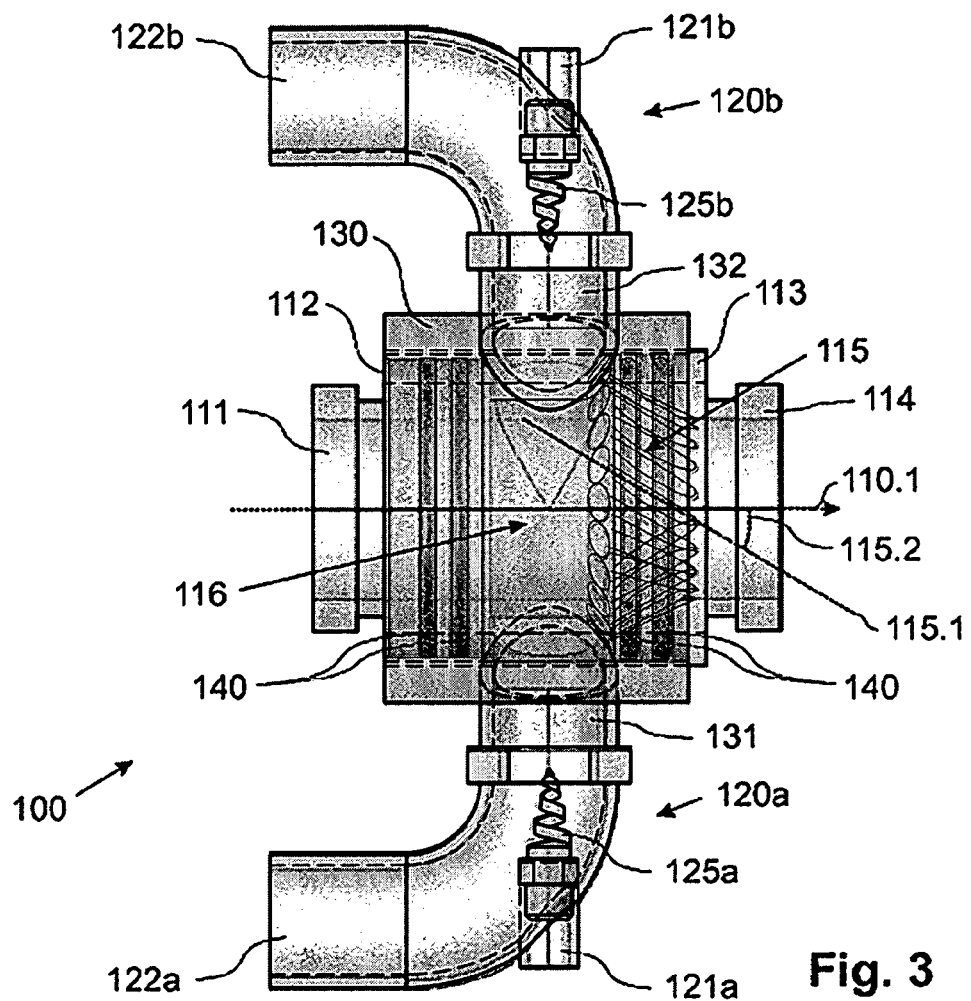
FIG. 3 Is a horizontal projection onto the mixing apparatus from FIG. 1 from a direction perpendicular to the direction of conveyance in a semitransparent presentation.
Figure 4:
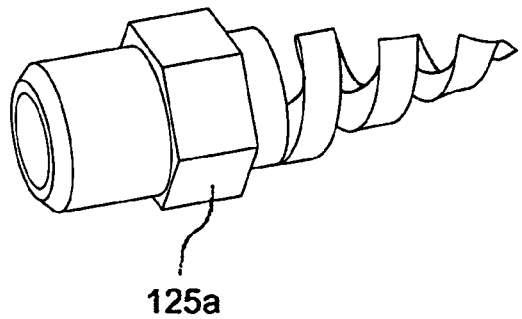
FIG. 4 Is a detailed view of a spiral nozzle, which in the mixing apparatus from FIG. 1 is arranged as a device for dispersion.
Figure 5:
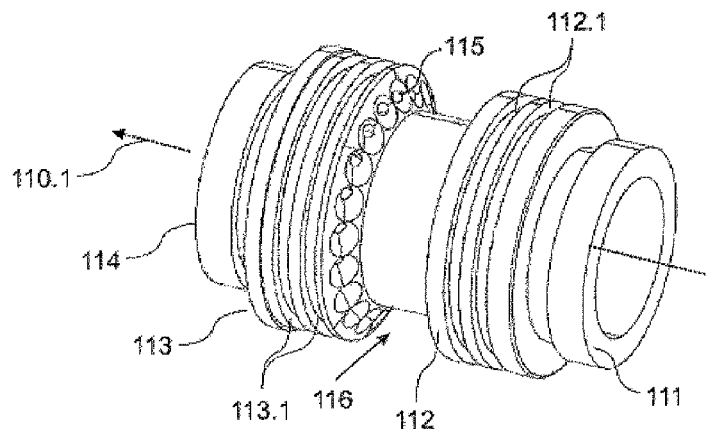
FIG. 5 Is a detailed view of the central hollow-cylindrical pipe length of the mixing apparatus from FIG. 1.
Figure 6:
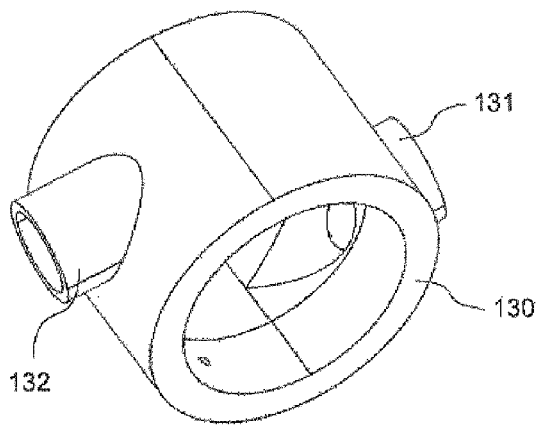
FIG. 6 Is a detailed view of the outer hollow-cylindrical pipe length of the mixing apparatus from FIG. 1 with two diametrically arranged and tangentially protruding connection nozzles.
Figure 7:
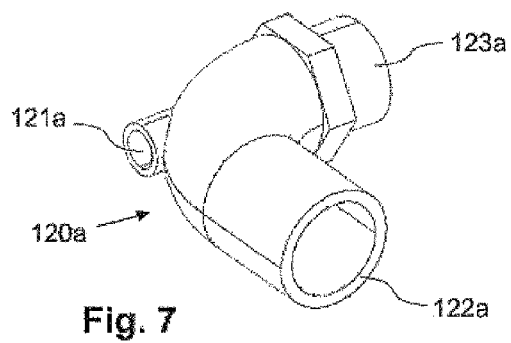
FIG. 7 Is a detailed view of an L-shaped pipe length of the mixing apparatus from FIG. 1.

FIGS. 1-3 show different views of a mixing apparatus 100 according to the invention. The presentations in FIGS. 2 and 3 show partially semitransparent components of the mixing apparatus, in order to clarify the structure according to the invention. Individual components of the mixing apparatus are moreover shown in detail in FIGS. 4-7. Unless otherwise stated, stainless steel is suitable as material for the mixing apparatus 100, for example.

The mixing apparatus 100 comprises a central hollow-cylindrical pipe length 110 (shown as an individual component in FIG. 5) with a circular cross-section, which functions as a delivery line for a pumpable mixture (not shown), such as a shotcrete composition. The inside diameter dimension of the hollow-cylindrical pipe length 110 is approximately 53 mm, for example. The central, hollow-cylindrical pipe length 110 has a first projecting connection flange 111 on the feed side end of the mixing apparatus, such as for connecting the mixing apparatus 100 with a conveyor device for a pumpable mixture.

On the other end of the mixing apparatus, the discharge end, a second projecting connection flange 114 is correspondingly arranged, which is used for connecting the mixing apparatus 100 with a processing device for the pumpable mixture, for example, such as a shotcrete nozzle. Between the two connection flanges 111, 114, in addition a projecting sealing flange 112 on the feed side and a sealing flange 113 on the discharge end are arranged. In this context, the two sealing flanges 112, 113 are arranged spaced apart, so that a substantially circular cavity 116 is present between the two sealing flanges 112, 113. In each case, the diameters of the two sealing flanges 112, 113 are larger than the diameters of the connection flanges 111, 114.

In each case, two circular, spaced apart circumferential grooves 112.1, 113.1 are recessed in the circumferential surfaces of the two sealing flanges 112, 113. In total, four sealing rings 140, plastic 0-rings, for example, exist in the grooves 112.1, 113.1, which protrude from the circumferential surface of the sealing flanges 112, 113.

Starting from the feed-side front of the sealing flange 113 on the discharge side, altogether 20 inlet ports 115 are arranged at regular spacing and axisymmetrically to the longitudinal centerline 110.1 of the hollow-cylindrical pipe length 110, said inlet ports 115 feeding into the cavity of the central hollow-cylindrical pipe length 110. In this context, a longitudinal centerline 115.1 of the inlet ports runs oblique-angled to a radial direction of the hollow cylindrical pipe length 110 and oblique-angled relative to the longitudinal axis of symmetry and/or the longitudinal centerline 110.1 of the hollow-cylindrical pipe length 110. The angles of inclination 115.2 between the longitudinal centerlines 115.1 of the inlet ports 115 and the longitudinal centerline 110.1 of the hollow-cylindrical pipe length 110 are approximately 45°, for example.

The longitudinal centerlines 115.1 of the inlet ports 115 therefore do not intersect the longitudinal centerline 110.1 of the delivery line. Expressed in other words, the longitudinal center lines 115.1 of the inlet ports penetrate the delivery line at points of the central hollow-cylindrical pipe length 110 which are not diametrically opposite.

The two sealing flanges 112, 113 are furthermore surrounded by an external hollow-cylindrical pipe length 130 (illustrated in FIG. 6 as an individual component), which on the inside fits flush against the four sealing rings 140, so that leak proof connections exist between the external pipe length 130 and the two sealing flanges 112, 113. The external pipe length 130 therefore seals the cavity 116 between the two sealing flanges 112, 113 leak proof against the outside. The cavity 116 sealed by the external pipe length 130 for this purpose forms a first annular section of a mixing chamber of the mixing apparatus 100.

The external pipe length 130 furthermore has two tubular connection flanges 131, 132, which are diametrically opposite and lead in the tangential direction and/or eccentrically into the cavity 116 between the two sealing flanges 112, 113. A first L-shaped and/or right-angled bent pipe length 120a with an inside diameter of approximately 33 mm, for example, is fitted leak proof on a connection flange 131 of the external pipe length 130 (illustrated as a single component in FIG. 7). The connection is done, for example, by screwing an external thread 123a on the end of the bent pipe length 120a into an internal thread existing in the connection flange 131.

In the bend of the first bent pipe length 120a, a first inlet 121a is arranged for feeding an additive, for example. For this purpose, the first inlet 121a leads in the direction of the first connection flange 131 into the first bent pipe length 120a. The open end of the first bent pipe length 120a forms a second inlet 122a, for example, for feeding a carrier medium.

The first inlet 121a is provided with a spiral nozzle 125a on the inside of the first bent pipe length 120a, which serves as a device for dispersing an additive. In this context, the spiral nozzle has a conical surrounding form and can be screwed on at the inner end of the inlet 121a, for example, (illustrated as an individual component in FIG. 4). The spiral nozzle 125a has 3 spirals, a spray angle of approximately 60°, for example, a maximum diameter transverse to the longitudinal direction of approximately 18 mm, and an overall length of approximately 48 mm.

A second L-shaped and/or right-angled bent pipe length 120b is attached on the other connection flange 132 of the external pipe length 130. The second bent pipe length 120b has substantially the same design as a first bent pipe length 120a, and accordingly has a first inlet 121b, a second inlet 122b, and a spiral nozzle 125b.

The two bent pipe lengths 120a, 120b together form a second tubular section of the mixing chamber of the mixing apparatus 100. The mixing chamber of the mixing apparatus 100 therefore consists of the two bent pipe lengths 120a, 120b and the annular cavity 116.

The elements surrounding the interior of the hollow-cylindrical pipe length 110 and/or the delivery line together form the metering device 101 of the mixing apparatus 100. By means of the metering device 101, an additive can be dispersed in a carrier medium and be metered into a pumpable mixture conveyed in the interior of the hollow-cylindrical pipe length 110.

2. Device for the Application of Shotcrete

Figure 8:
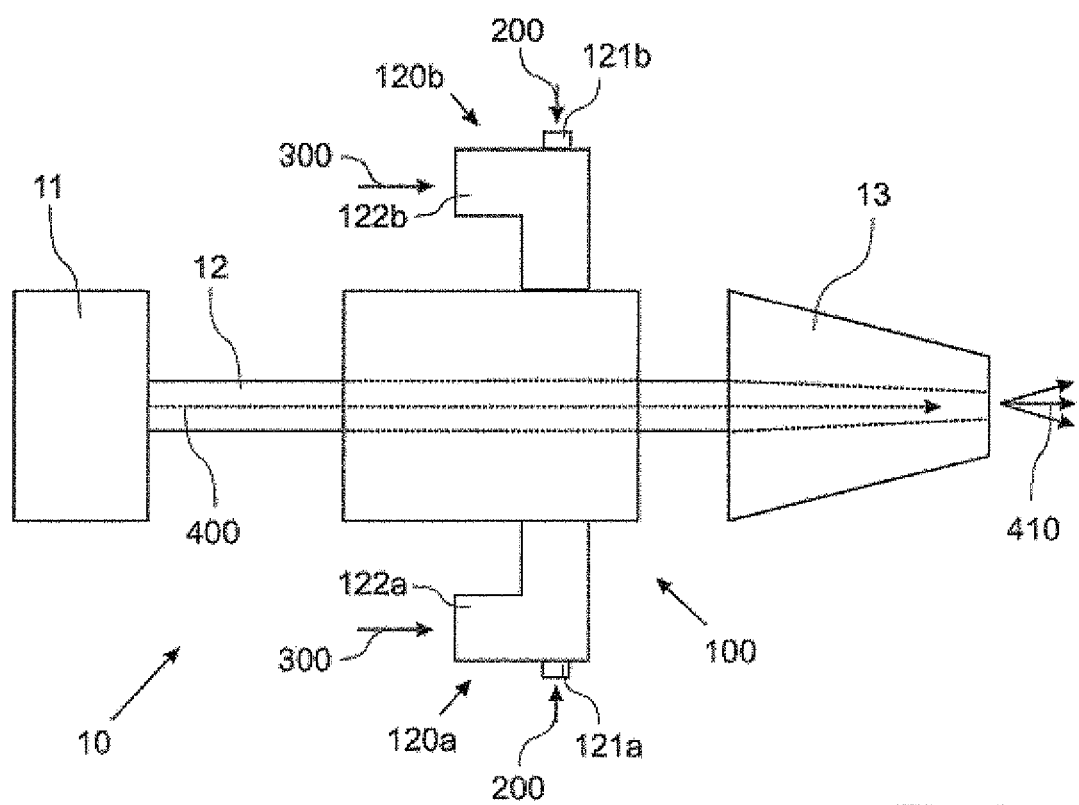
FIG. 8 Is a schematic presentation of an arrangement for the discharge of shotcrete.

FIG. 8 schematically illustrates a shotcrete application device 10. It comprises a pumping device 11 which is connected to the first connection flange 111 of the mixing device 100 according to the invention from FIG. 1-3, for conveying a shotcrete composition 400 by means of a line 12. The second connection flange 114 of the mixing device is connected again by means of a line or directly to a shotcrete nozzle 13. The shotcrete composition 400 can be a dry-mix shotcrete composition or a wet-mix shotcrete composition, in principle. The conveyance is performed depending on the shotcrete composition 400 and application in a manner known per se, such as the dense matter conveyance method or the thin-stream method.

By means of the two first inlets 121a, 121b of the mixing device 100 and the spiral nozzles 125a, 125b arranged therein, it is possible to disperse a liquid additive 200 in the two bent pipe lengths 120a, 120b, for example, in particular a setting accelerator. By means of the two second inlets 122a, 122b, it is moreover a possible to feed a carrier medium 300, such as compressed air, so that an aerosol consisting of additive 200 and carrier medium 300 is present in the mixing chamber and/or in the two bent pipe lengths 120a, 120b and the annular cavity 116 of the mixing apparatus 100. This now reaches the interior of the central cylindrical pipe length 110 and/or the shotcrete composition 400 conveyed therein by means of the inlet ports 115. The shotcrete composition 410 mixed with the additive 200 and the carrier medium can subsequently be applied by means of the shotcrete nozzle 13 at an intended location, such as on a tunnel wall. The feed of the additive 200 and of the carrier medium 300 up to the associated inlets 121a, 121b, 122a, 122b can be performed in a manner known per se.

The previously described embodiments are to be understood merely as illustrative examples, which can be optionally modified within the scope of the invention.

It is thus for instance possible to omit the second connection flanges 132 with the second bent pipe length 120b, so that the connection flange 131 exists as the only connection flange. Likewise, if needed, additional connection flanges can be provided on the external pipe length 130 and/or in one of the bent pipe lengths 120a, 120b.

In addition to or instead of the spiral nozzles 125a, 125b, in principle also other devices can be used for dispersing, such as they were previously described, for example.

Likewise, one or both of the bent pipe lengths 120a, 120b can be replaced by a traditional T-shaped pipe length, for example, if this appears to be expedient. In this case, the respective pipe ends of the T-shaped pipe length can serve as inlets for the additive and the carrier medium, which may possibly simplify the manufacture.

It is also possible, to provide in addition to or instead of the existing inlet ports 115 additional inlet ports, which run in a radial direction with reference to the central hollow-cylindrical pipe length 110, for example, and/or are formed in a direction intersecting the longitudinal centerline 110.1

Instead of the central hollow-cylindrical pipe length 110, also a differently designed delivery line can exist for the pumpable mixture, which has an oval cross-section, for example.

3. Examples of Use

For purposes of comparison, different wet-mix shotcrete trials with and without the mixing apparatus 100 according to the invention from FIG. 1-3 were performed.

For the test according to the invention, a traditional shotcrete machine AMV 6400 from Andersen Mekaniska Verkstad AS (Norway) was used for the application of wet-mix shotcrete, which was fitted directly upstream of the shotcrete nozzle with a mixing apparatus 100 according to the invention from FIG. 1-3. This array corresponds in principle to the shotcrete device 10, illustrated in FIG. 8. For this purpose, a liquid setting accelerator was fed via the first inlets 121a, 121b and compressed air via the second inlets 122a, 122 of the mixing apparatus 100, under normal conditions.

The shotcrete machine was operated with the following parameters:
Shotcrete delivery rate: approximately 30 $m^3/h$
Compressed air delivery rate: approximately 16 $m^3/h$
Compressed air pressure: 7.0-7.5 bar
Setting accelerator pump output: approximately 30 l/min
Setting accelerator pump pressure: max. 18 bar The same array was used for the comparison tests as was used for the tests according to the invention, wherein instead of the mixing device 100, a traditional mixing apparatus was used, however. With the traditional mixing apparatus, the setting accelerator was fed to the compressed air without additional measures via a connection flange and added directly into the wet-mix shotcrete. The remaining test conditions were essentially unchanged.

Wet-mix shotcrete was used in the following composition:
Portland cement type CEM II/A-LL 42.5 R; proportion: 500 $kg/m^3$
Silica content: 20 $kg/m^3$
Aggregates: 82% crushed sand 0-4 mm, 18% gravel 4-8 mm
Water/cement ratio: 0.43
Concrete plasticizer: Sikament EVO 26S, 0.40% relative to cement content
Consistency regulator: Sika Tard 930, 0.30% relative to cement content
Air-entraining agent: Sika Aer-S, 0.06% relative to cement content
Slump: 200-210 mm Sigunit L53 AF (Sika) was used as setting agent in all tests.

To determine the quality of the concrete sprayed unto a test surface, the strength development was determined in manner known per se with penetration needles (Proctor; 30 and 60 minutes after the application) as well as the HILTI anchor bolt method (HILTI 460; 4 hours after the application).

The tests performed are listed in Table 1 below. The proportion of the setting accelerator Sigunit L53 AF is stated here in % by weight relative to the cement content. The column "addition" states whether the mixing apparatus (E) according to the invention or the traditional mixing apparatus (H) was used.

TABLE 1

| No. | Sigunit L53 AF in % | Addition | Strength in MPa after | | |
|---|---|---|---|---|---|
| | | | 30 min | 60 min | 4 h |
| 1 | 5% | H | 0.16 | 0.40 | 3.3 |
| 2 | 8% | H | 0.24 | 0.67 | 4.1 |
| 3 | 11% | H | 0.47 | 0.86 | 4.7 |
| 4 | 4% | E | 0.38 | 0.74 | 3.8 |
| 5 | 6.5% | E | 0.62 | 0.82 | 4.6 |
| 6 | 8.5% | E | 0.61 | 0.92 | 5.2 |

The tests 1-3, which were performed with the traditional mixing apparatus, show that the proportion of the setting accelerator affects the strength of the shotcrete applied. The higher the proportion of accelerator, the higher the strengths generally over the times reviewed. A corresponding picture results from the tests 4-6 when using the mixing apparatus according to the invention.

It is particularly noted, however, that by using the mixing apparatus according to the invention, higher strengths can be obtained using a smaller proportion of accelerator. Looking at Test 1, for example, with the traditional mixing apparatus and a proportion of 5% of accelerator, a strength of merely 0.16 MPa is obtained after 30 minutes. By using the mixing apparatus according to the invention, in Test 4 and using an even slightly smaller proportion of accelerator of 4%, more than double the strength of 0.38 MPa is obtained after 30 minutes. Even after 60 minutes and 4 hours, the strengths in Test 4 with the mixing apparatus according to the invention are clearly above the corresponding strengths from Test 1. A comparison of Tests 2 and 5 as well as 3 and 6 confirms these observations.

In summary it must be noted that the addition of the setting accelerator using the mixing apparatus according to the invention significantly reduces the consumption of setting accelerator while maintaining equal or improved quality of the shotcrete.

The invention claimed is:

1. A mixing apparatus for the metered addition of an additive to a pumpable mixture, wherein the mixing apparatus comprises a delivery line for delivering the mixture through the mixing apparatus and a metering device communicating with the delivery line for introducing the additive into the mixture is provided, wherein the metering device has a device for dispersing the additive in a carrier medium such that the additive can be introduced into the mixture in a state in which the additive is finely distributed in the carrier medium; wherein
the metering device has a mixing chamber which communicates with the delivery line, and where said mixing chamber comprises a first inlet for feeding the additive and a second inlet for feeding the carrier medium;
the mixing chamber comprises a first section which surrounds the delivery line and a tubular second section which terminates in the first section; and
the first inlet for feeding the additive is arranged in a bend of the second section of the mixing chamber.

2. The mixing apparatus according to claim 1, wherein the tubular second section of the mixing chamber substantially terminates in an annular cavity in a tangential direction and/or eccentrically.

3. The mixing apparatus according to claim 1, wherein the device for dispersing the additive is positioned at the first inlet for feeding the additive.

4. The mixing apparatus according to claim 1, wherein the first inlet for feeding the additive in a feeding direction is arranged upstream of the second inlet for feeding the carrier medium.

5. The mixing apparatus according to claim 1, wherein the metering device comprises at least one inlet port for introducing the additive into the pumpable mixture and which terminates in the delivery line, wherein the inlet port is designed such that a longitudinal axis of the inlet port does not intersect an axis of symmetry of the delivery line.

6. The mixing apparatus according to claim 5, wherein the longitudinal axis of the at least one inlet port is inclined in an intended direction of conveyance of the pumpable mixture, wherein an angle of inclination between the longitudinal axis of the inlet port and the intended direction of conveyance is 10-80°.

7. The mixing apparatus according to claim 1, further comprising multiple inlet ports arranged axisymmetrically around the delivery line.

8. The method for the metered addition of an additive into a pumpable mixture, the method comprising adding the additive to a pumpable mixture via the mixing apparatus of claim 1, wherein adding the additive to a pumpable mixture comprises dispersing the additive in a carrier medium that is subsequently introduced into the pumpable mixture.

9. The method according to claim 8, wherein the pumpable mixture is a pumpable hydraulically setting mixture.

10. The method according to claim 8, wherein the carrier medium is a gas.

11. The method according to claim 8, wherein the additive is a liquid.

12. The method according to claim 8, wherein the additive is dispersed in the carrier medium by means of an atomizing nozzle.

13. The method according to claim 12, wherein a spiral nozzle is used as atomizing nozzle.

14. The method according to claim 8, wherein during the dispersion of the additive in the carrier medium an aerosol is formed, which is subsequently introduced into the mixture.

15. The method according to claim 14, wherein the aerosol is formed by atomizing the additive in the carrier medium.

16. The method according to claim 8, wherein during the dispersion of the additive in the carrier medium the additive is pressurized with a higher pressure than the carrier medium.

17. The method according to claim 16, wherein the additive is pressurized with a pressure that corresponds to at least 1.1 times of the pressure in the carrier medium.

18. The method according to claim 8, wherein during the dispersion of the additive in the carrier medium, the additive is pressurized with a pressure of 1-20 bar and/or the carrier medium is pressurized with a pressure of 1-15 bar.

19. The method for the metered addition of an additive into a shotcrete composition, wherein the mixing apparatus according to claim 1 is used to disperse an additive in a carrier medium, which is subsequently introduced into the composition.

20. A mixing apparatus for the metered addition of an additive to a pumpable mixture, wherein the mixing apparatus comprises a delivery line for delivering the mixture through the mixing apparatus and a metering device communicating with the delivery line for introducing the additive into the mixture is provided, wherein the metering device has a device for dispersing the additive in a carrier medium such that the additive can be introduced into the mixture in a state in which the additive is finely distributed in the carrier medium, wherein the device for dispersing the additive is an atomizing nozzle.

21. The mixing apparatus according to claim 20, wherein the atomizing nozzle is a spiral nozzle with a spray angle of 45-175°.

22. The method for the metered addition of an additive into a pumpable mixture, the method comprising adding the additive to a pumpable mixture via the mixing apparatus of claim 8, wherein adding the additive to a pumpable mixture comprises dispersing the additive in a carrier medium that is subsequently introduced into the pumpable mixture.

23. A device for applying shotcrete, comprising a mixing apparatus mixing apparatus for the metered addition of an additive to a pumpable mixture, wherein the mixing apparatus comprises a delivery line for delivering the mixture through the mixing apparatus and a metering device communicating with the delivery line for introducing the additive into the mixture is provided, wherein the metering device has a device for dispersing the additive in a carrier medium such that the additive can be introduced into the mixture in a state in which the additive is finely distributed in the carrier medium, and a pump device for shotcrete and a shotcrete nozzle.

* * * * *